United States Patent
Wang et al.

(10) Patent No.: US 11,604,947 B2
(45) Date of Patent: Mar. 14, 2023

(54) GENERATING QUASI-REALISTIC SYNTHETIC TRAINING DATA FOR USE WITH MACHINE LEARNING MODELS

(71) Applicant: X Development LLC, Mountain View, CA (US)

(72) Inventors: Kangkang Wang, San Jose, CA (US); Bodi Yuan, Sunnyvale, CA (US); Lianghao Li, Redwood City, CA (US); Zhiqiang Yuan, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/947,984

(22) Filed: Aug. 26, 2020

(65) Prior Publication Data

US 2022/0067451 A1    Mar. 3, 2022

(51) Int. Cl.
*G06K 9/62* (2022.01)
*G06V 30/194* (2022.01)

(52) U.S. Cl.
CPC ......... *G06K 9/6267* (2013.01); *G06V 30/194* (2022.01)

(58) Field of Classification Search
CPC ........ G06K 9/66; G06K 9/6267; G06F 30/00; G06N 20/00; G05B 13/00
See application file for complete search history.

(56) References Cited

U.S. PATENT DOCUMENTS

| | | | | |
|---|---|---|---|---|
| 10,949,972 | B2 * | 3/2021 | Guo | G06V 20/188 |
| 2014/0294247 | A1 * | 10/2014 | Sirault | G06V 10/267 |
| | | | | 382/110 |
| 2017/0206415 | A1 * | 7/2017 | Redden | H04N 13/239 |
| 2019/0147582 | A1 * | 5/2019 | Lee | G06T 11/00 |
| | | | | 382/156 |
| 2019/0179982 | A1 * | 6/2019 | Reese | G06F 30/20 |

(Continued)

OTHER PUBLICATIONS

Di Cicco, Automatic Model Based Dataset Generation for Fast and Accurate Crop and Weeds Detection, 2017, International Conference on Intelligent Robots and Systems, 5188-5195 (Year: 2017).*

(Continued)

*Primary Examiner* — Nancy Bitar
(74) *Attorney, Agent, or Firm* — Gray Ice Higdon

(57) ABSTRACT

Implementations are described herein for automatically generating quasi-realistic synthetic training images that are usable as training data for training machine learning models to perceive various types of plant traits in digital images. In various implementations, multiple labeled simulated images may be generated, each depicting simulated and labeled instance(s) of a plant having a targeted plant trait. In some implementations, the generating may include stochastically selecting features of the simulated instances of plants from a collection of plant assets associated with the targeted plant trait. The collection of plant assets may be obtained from ground truth digital image(s). In some implementations, the ground truth digital image(s) may depict real-life instances of plants having the target plant trait. The plurality of labeled simulated images may be processed using a trained generator model to generate a plurality of quasi-realistic synthetic training images, each depicting quasi-realistic and labeled instance(s) of the targeted plant trait.

18 Claims, 6 Drawing Sheets

(56) References Cited

U.S. PATENT DOCUMENTS

| | | | | |
|---|---|---|---|---|
| 2019/0377946 A1* | 12/2019 | Genty | .................... | G06T 7/0004 |
| 2019/0385018 A1* | 12/2019 | Ngo Dinh | ................ | G06N 3/08 |
| 2020/0005063 A1* | 1/2020 | Ralls | ....................... | G06V 10/95 |
| 2020/0117897 A1* | 4/2020 | Froloff | ................. | G06V 10/147 |
| 2020/0356899 A1* | 11/2020 | Rejeb Sfar | ............... | G06N 3/04 |

OTHER PUBLICATIONS

Sohn, Kihyuk et al.; A Simple Semi-Supervised Learning Framework for Object Detection; Google Cloud AI—Google Brain; 23 pages; dated May 1, 2020.

Jeong, Jisoo et al.; Consistency-based Semi-supervised Learning for Object Detection; Department of Transdisciplinary Studies Graduate School of Convergence Science and Technology Seoul National University; 10 pages; dated 2019.

Zhu, Jun-Yan et al.; Unpaired Image-to-Image Translation using Cycle-Consistent Adversarial Networks; Berkeley AI Research (BAIR) laboratory; 18 pages; dated Nov. 15, 2018.

Wei, Jerry; Using Generative Adversarial Networks (GANs) for Data Augmentation in Colorectal Images; Health Data Science; 12 pages; dated Dec. 15, 2019.

* cited by examiner

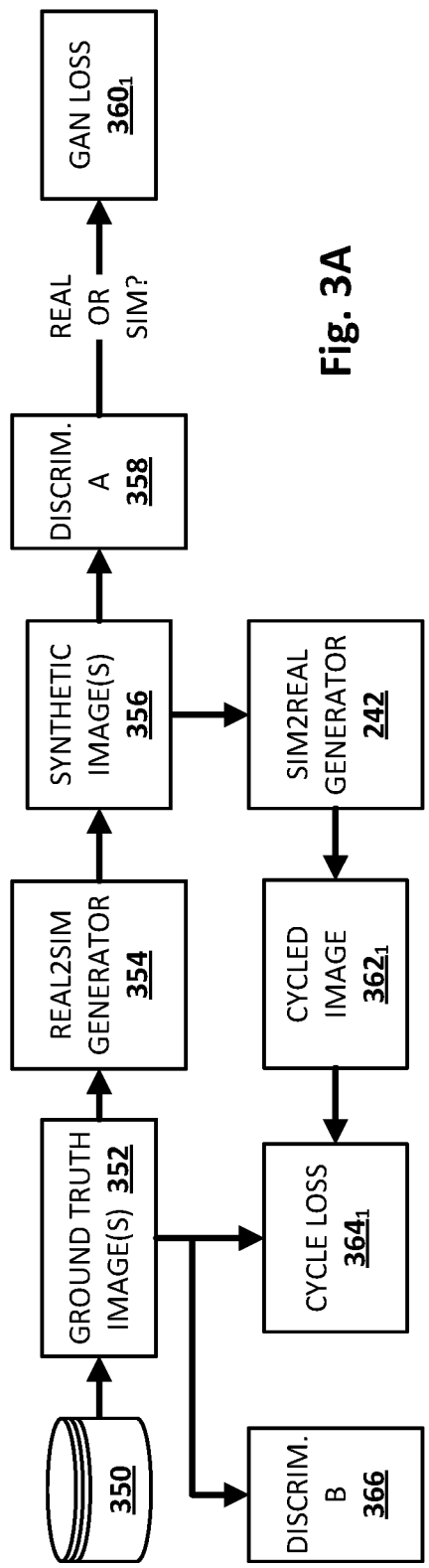
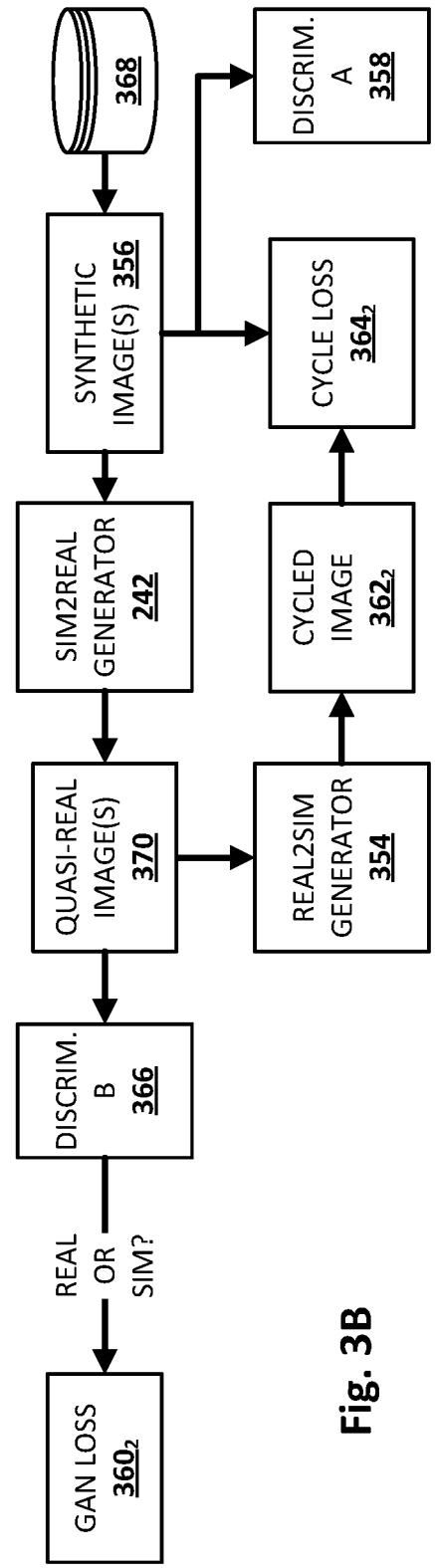
Fig. 3A
Fig. 3B

GENERATING QUASI-REALISTIC SYNTHETIC TRAINING DATA FOR USE WITH MACHINE LEARNING MODELS

BACKGROUND

Identification of plant traits in digital imagery has numerous applications. One example application is detection, classification, and/or segmentation of unwanted and/or invasive plants, such as weeds. Another example application is detection, classification, and/or segmentation of plant disease. Yet another example application is detection, classification, and/or segmentation of other types of plant traits, such as plant genus or species (either of which may fall under the definition of plant "type"), phenotypic traits (e.g., gender, strain), and so forth. Various types of machine learning models can be trained to segment and/or recognize various types of plant traits in digital images. Convolutional neural networks are one popular example. However, the accuracy of these machine learning models depends largely on the amount of training data used to train them. Annotating training images on a pixel-wise basis and/or using bounding shapes can be prohibitively costly. Moreover, images of plants having some traits may not be as widely available or easily acquired as images of plants having other traits.

SUMMARY

Implementations are described herein for automatically generating quasi-realistic synthetic training images that are usable as training data for training machine learning models to detect, segment, and/or classify various types of plant traits in digital images. Annotation of these quasi-realistic synthetic training images can be performed automatically as part of the generation process, at a per-pixel level or using bounding shapes, significantly reducing or eliminating the costs associated with creating annotated training data from real-life digital images. These quasi-realistic synthetic training images may then be used for various purposes, such as training other machine learning models (e.g., CNNs) to detect various traits of plants (e.g., plant type, plant gender, plant disease, plant strain, plant health, plant malady, etc.).

In various implementations, various aspects of the labeled simulated images (which are then used to generate the quasi-realistic synthetic training images) may be generated based at least in part on "ground truth" imagery of plants having plant traits-to-be-simulated. For example, ground truth imagery that depicts plant(s) having some targeted trait (i.e. a trait for which there is demand to detect in digital imagery) may be analyzed using various segmentation techniques to identify various plant parts, or plant "assets." These plant assets may include various physical attributes and/or components of the depicted plant(s), such as leaf sizes, leaf shapes, leaf spatial and numeric distributions, branch sizes/shapes, flower size/shapes, etc. These plant assets may be stored as a collection of plant assets from which labeled simulated images of plant(s) can then be generated. For example, in some implementations, the labeled simulated images of the plant(s) may be generated by stochastically selecting and/or arranging features of simulated instance(s) of plant(s) from the collection of plant assets.

To the naked eye the labeled simulated images may appear relatively realistic. However, when viewed side-by-side with ground truth imagery of plants having the same targeted traits, the synthetic images may be relatively easy to distinguish from the ground truth images. Consequently, the synthetic images may be less-than-ideal for use as training data. Accordingly, the labeled simulated images may be further processed using a machine learning model to generate quasi-realistic synthetic images of plant(s) having the targeted trait(s). In some implementations, the machine learning model may be trained to generate the quasi-realism via ground truth imagery, such as the same ground truth images used to build the collection of plant assets described previously or different digital images.

In some implementations, the machine learning model may take the form of a generator model of a generative adversarial network ("GAN"). The generator model may be trained alongside a discriminator model to translate labeled simulated images from a "simulated" domain to a "quasi-realistic" domain, i.e. to generate the quasi-realistic synthetic training images from the labeled simulated images. In some implementations, multiple generator and discriminator models may be employed to train the generator model. For example, a type of GAN referred to as "CycleGAN" may include two generators, one to convert from a simulated domain to a quasi-realistic domain and another to convert from the quasi-realistic domain to the simulated domain. Similarly, one discriminator model may be trained to classify images as quasi-realistic or not, whereas another discriminator model may be trained to classify an image as simulated or not. Or, a single discriminator model may be deployed. Once these models are trained, the simulated-to-quasi-realistic generator model may be well-suited to translate labeled simulated images into quasi-realistic images, which carry over the labels (which may take various forms, such as pixel-wise annotations, bounding boxes, etc.) from the source synthetic image(s).

In some implementations, a method implemented using one or more processors may include: generating a plurality of labeled simulated images, each labeled simulated image depicting one or more simulated and labeled instances of a plant having a targeted plant trait, wherein the generating includes stochastically selecting features of the simulated instances of plants from a collection of plant assets associated with the targeted plant trait, wherein the collection of plant assets are obtained from one or more ground truth digital images captured previously by one or more vision sensors, and wherein the one or more ground truth digital images depict real-life instances of plants having the target plant trait; and processing the plurality of labeled simulated images using a trained generator model to generate a plurality of quasi-realistic synthetic training images, wherein each quasi-realistic synthetic training image depicts one or more quasi-realistic and labeled instances of the targeted plant trait.

In various implementations, the generator model is trained at least in part based on one or more of the ground truth digital images. In various implementations, the method further includes analyzing the one or more ground truth digital images to segment depicted plant assets for inclusion in the collection of plant assets. In various implementations, the depicted plant assets may include one or more features of leaves of plant(s) having the targeted plant trait.

In various implementations, the plurality of labeled simulated images may be labeled with pixel-wise annotations or bounding shapes. In various implementations, the stochastically selecting may be based on different weights assigned to different plant assets of the collection. In various implementations, the different weights may be selected based on one or more environmental conditions observed or predicted in a selected geographic area.

In various implementations, the generator model is trained as part of a cycle generative adversarial network (cycleGAN). In various implementations, the generator model comprises a conditional generator model. In various implementations, the conditional generator imposes a constraint on generation of the plurality of quasi-realistic synthetic training images, wherein the constraint is based on input drawn by a user.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A and FIG. 3B depict an example of how a cyclic generative adversarial network paradigm can be used to train various models, in accordance with various implementations.

DETAILED DESCRIPTION

Figure 1:
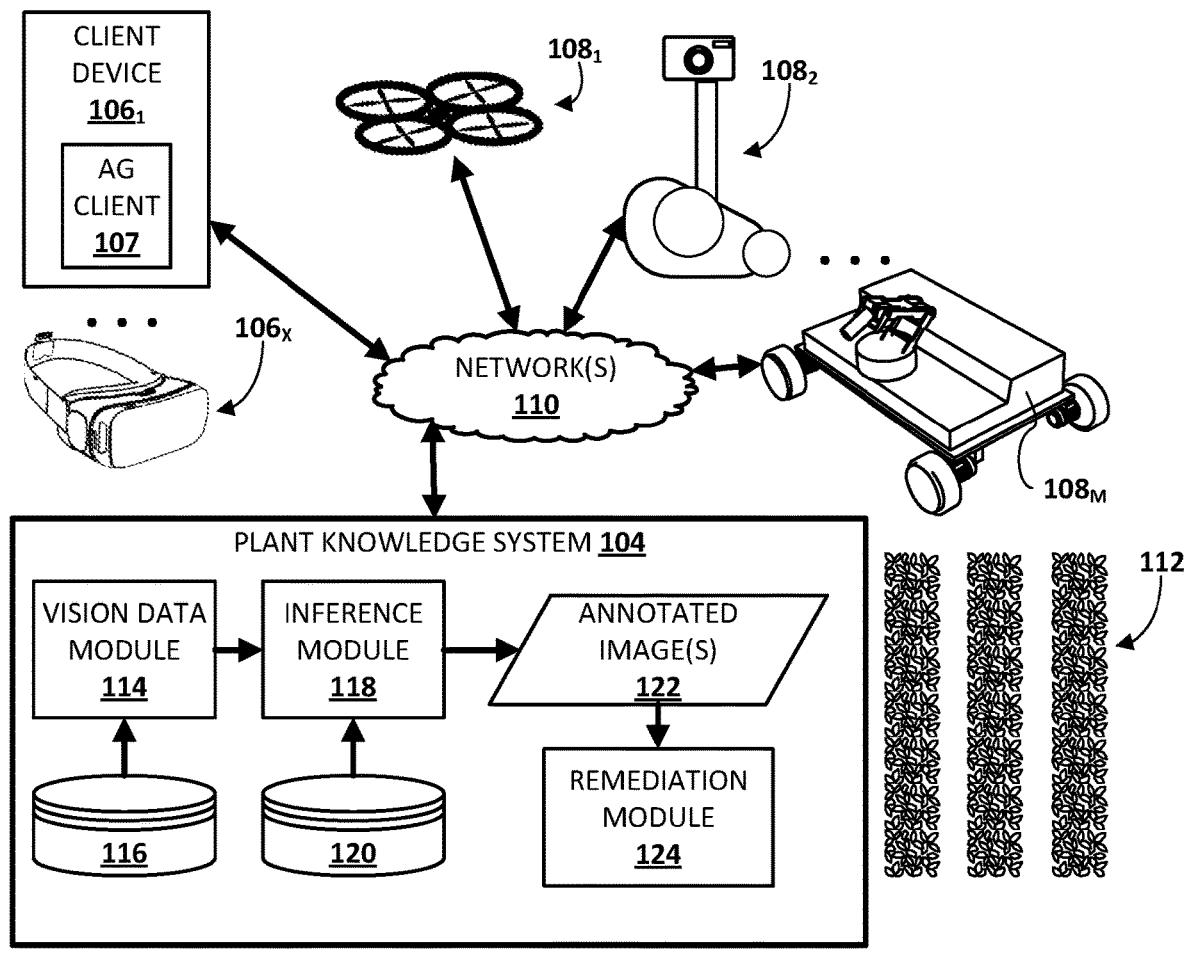
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment plants having particular targeted traits. Plant traits may take various forms, including but not limited to plant types (e.g., genus, species, variety, etc.), plant gender, various observable characteristics of a plant resulting from an interaction of the plant's genotype with its environment ("phenotype"), plant disease, stage of growth, presence/absence of some targeted gene/gene sequence, etc. As one non-limiting example, there may be considerable interest and/or benefit in automatically detecting plants having a trait of being "undesirable" (sometimes such plants are referred to as "weeds") in an area 112 in which other desired plants are being grown. Once detected, various remedial actions may be taken, such as flagging the weeds' locations for removal or treatment (e.g., herbicide application) by agricultural personnel and/or farming equipment.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that Provides an AR or VR Immersive Computing Experience, a "Smart" Watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a remediation module 124 (described in more detail below) may generate a report, a map, instructions, and/or any other data that may be presented to an operator of a client device using a graphical user interface, audibly, etc. These data may inform the agricultural personnel where plants having targeted traits (e.g., weeds, diseased plants, plants have desired characteristics, etc.) are located, what action(s) should be taken on those plants, a timeframe in which those action(s) should be taken, etc.

In some implementations, one or more robots $108_{1-M}$ may be deployed to perform various agricultural tasks. Performance of some of these tasks—including but not limited to weed remediation, plant harvesting, etc.—may be performed using machine learning model(s) trained on synthetic training data created using techniques described herein. An individual robot $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_M$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras, etc.), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may be referred to as the "cloud." Plant knowledge system 104 may receive vision data generated by robots $108_{1-M}$ (and/or robots at other agricultural sites) and process it using various image processing techniques to perform tasks such as detection, classification, and/or segmentation of plants having targeted traits. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots $108_{1-M}$. Plant knowledge system 104 may also include a machine learning model database 120 that includes one or more machine learning models that are trained based on synthetic training data generated using techniques described herein. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots $108_{1-M}$. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to apply imagery data received from vision data module 114 as input across various machine learning models stored in machine learning model database 120 to generate output. This output may be indicative of plants having targeted traits that are detected, segmented, and/or classified in imagery data received from vision data module 114. To this end, machine learning models stored in database 120 may be trained to detect, classify, and/or segment plants with targeted traits, such as two-dimensional digital images of agricultural area (s) 112 captured by agricultural personnel and/or by robot(s) 108.

Various types of machine learning models may be trained, e.g., using synthetic training data generated using techniques described herein, to detect, classify, and/or segment plants having targeted traits in imagery data. In some implementations, a convolutional neural network ("CNN") may be trained to generate output indicative of the presence and/or absence of targeted trait(s) in plants depicted in digital imagery. In FIG. 1, for instance, inference module 118 generates annotated image(s) 122 that include pixel-wise annotations identifying one or more plants having targeted traits. These pixel-wise annotations may be used, for instance, to segment the digital image into portions showing plants having targeted traits, such as weeds, diseased plants, plants having some desired characteristic, etc. In some such implementations, a remediation module 124 may be configured to take remedial action using these annotated and/or segmented images 122. For example, in some implementations, remediation module 124 may deploy one or more robots 108 to take remedial action on the plants detected as having the detected traits, such as pulling weeds, spraying weeds with chemicals, destroying weeds using other mechanical and/or energy-based means, harvesting desired plant parts (e.g., fruits, flowers, etc.), and so forth. In other implementations, inference module 118 may output one or more probabilities that one or more plants having targeted traits are detected in an image. In some implementations, remediation module 124 may provide output that includes, for instance, a map of plants having a targeted trait, e.g., for remediation or other action by agricultural personnel.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect plants having targeted traits. Robot 108 may also include its own remediation module 124 that enables robot 108 to take remedial action.

As noted previously, obtaining sufficient ground truth training data to train machine learning model(s) such as CNNs to detect particular plants having various targeted traits may be resource-intensive and/or difficult. While images of plants having some desirable traits (e.g., fruit ready for harvest) may be captured relatively frequently, pictures of plants having less common traits (e.g., weeds, diseased plants, plants incapable of reproducing, etc.) may be less common. Accordingly, techniques are described herein for generating synthetic training data with little or no human intervention that can be used to train machine learning model(s) such as CNNs to detect plants having targeted traits.

Figure 2:
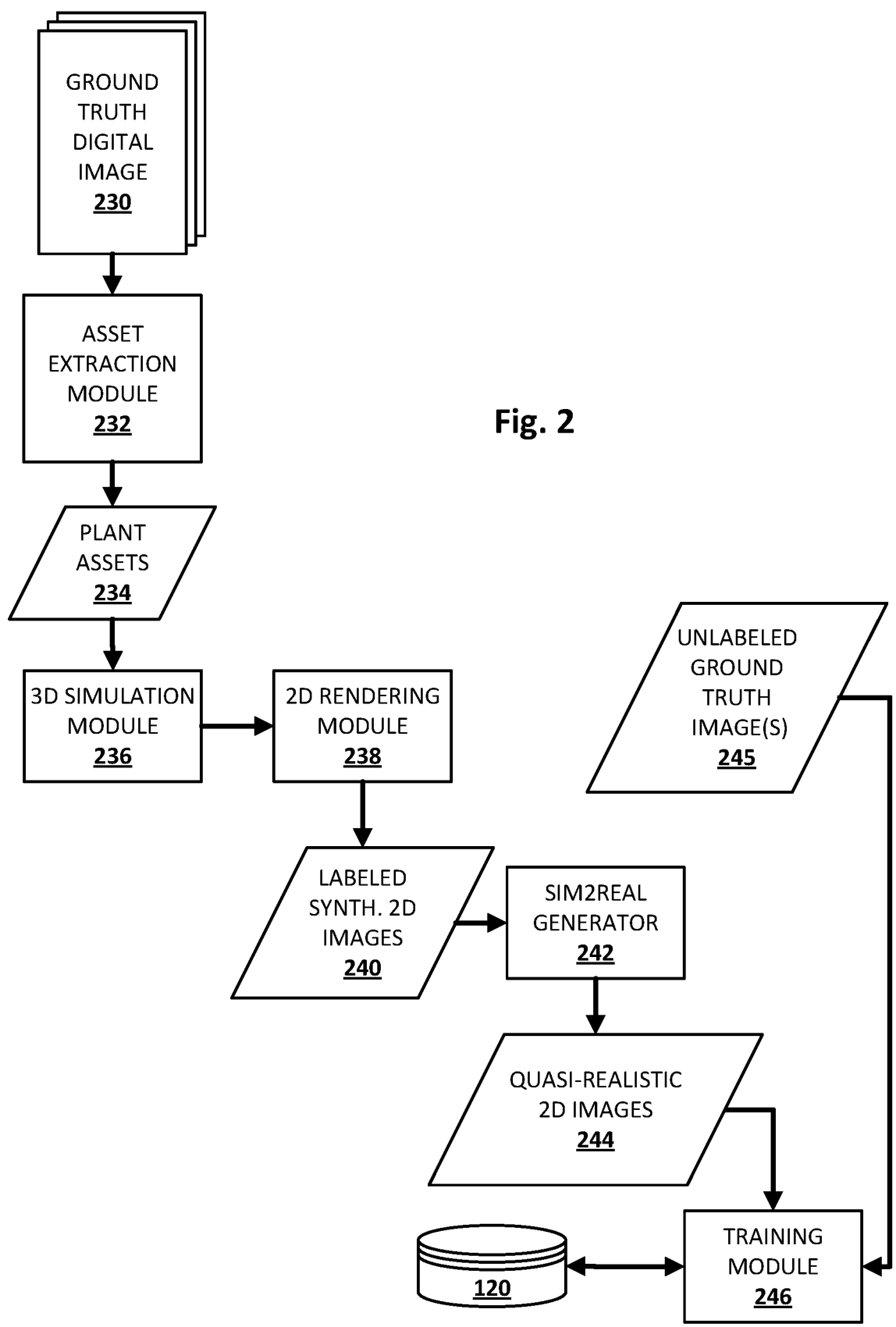
FIG. 2 schematically depicts components and a process for practicing selected aspects of the present disclosure, in accordance with various implementations.

FIG. 2 depicts an example process pipeline for generating synthetic training data in accordance with various implementations described herein. Various components depicted in FIG. 2 may be implemented using any combination of software and hardware, and in some cases may be implemented as part of plant knowledge system 104. Starting at top left, one or more ground truth digital images 230 depicting plants having targeted trait(s) may be captured and/or retrieved from a database. These images may be captured, for instance, by robots $108_{1-M}$ and/or by agricultural personnel, and/or may be stored in and retrieved from a database such as imagery database 116.

An asset extraction module 232 may be configured to process digital image(s) 230 in order to classify and/or segment individual plants, and parts of those individual plants (e.g., stems, leaves, flowers, fruit, etc.). This segmentation may allow for extraction of individual plants and/or plant parts for use as "plant assets" 234. Plant assets 234 may be stored in a database (not depicted) and used subsequently to generate synthetic imagery of plants having desired trait(s).

For example, in some implementations, individual plant assets 234 may be stochastically (e.g., non-deterministically) selected, e.g., by a three-dimensional ("3D") simulation module 236, and arranged in order to generate synthetic plants. In some implementations, this stochastic selection may be weighted based on a variety of factors, such as observed or hypothetical environmental conditions, observed and/or hypothetical agricultural practices, etc. Put another way, individual plant assets may be weighted for stochastic selection based on these factors.

As mentioned above, 3D simulation module 236 may be configured to utilize plant assets 234 to generate synthetic plants. For example, 3D simulation module 236 may stochastically select various numbers and/or types of plant assets for various numbers of synthetic plants, and may generate 3D models of the synthetic plants using the stochastically-selected assets in arrangements that may or may not also be at least partially stochastically selected. For example, some plants may tend to grow groups of leaves in layers. Accordingly, when generating a synthetic version of such a plant, the general arrangement layers may be dictated by the plant type and age (e.g., in light of its environmental conditions), whereas the number, shape, and/or size of leaves per layer may be stochastically selected.

A two-dimensional ("2D") rendering module 238 may then take these 3D models and incorporate them into a 2D image, e.g., by projecting the 3D models onto a 2D background. In various implementations, this 2D background, which also may be referred to (and function as) as "canvas," may be a ground truth image captured by a digital camera of an area (e.g., a field), or may be a simulated environment. Such a simulated environment may be simulated by a computer, e.g., automatically or with guidance from an author. In other implementations, the 2D background may be drawn or painted. Because 2D rendering module 238 incorporates the 3D plant models at known locations, 2D rendering module 238 is able to generate synthetic 2D images 240 that are labeled with this information. These labels may take various forms, such as pixel-wise annotations, bounding shapes such as bounding boxes that encompass plants having targeted traits, etc.

A "sim2real" generator 242 may be configured to process labeled synthetic 2D images 240 in order to generate quasi-realistic 2D images 244. These quasi-realistic 2D images 244 may include the same synthetic plants (including the same selected plant assets 234) as labeled synthetic 2D images. Moreover, the labels of labeled synthetic 2D images 240 may be preserved in (or in association with) into quasi-realistic 2D images 244. Various examples of how sim2real generator 242 may be trained and implemented will be described in more detail below. Notably, quasi-realistic 2D image(s) 244 may be more effective and/or efficient training data than synthetic 2D images 240.

A training module 246 may be configured to apply data indicative of quasi-realistic 2D images 244—e.g., the images themselves or embeddings generated therefrom—as inputs across one or more machine learning models from database 120 mentioned previously. The one or more machine learning models may include, for instance, a CNN that is intended to annotate quasi-realistic 2D images in various ways (e.g., pixel-wise annotations, bounding shapes) to identify plants and/or parts of plants exhibiting targeted trait(s).

The annotations based on such a machine learning model may be compared, e.g., by training module 246 as part of supervised training, to the labels associated with quasi-realistic 2D images 244. Any difference(s) or "error" between the annotations and the labels may be used by training module 246 to train the machine learning model, e.g., using techniques such as gradient descent, back propagation, etc. Once trained, the machine learning model can be used by inference module 118 as described previously with FIG. 1. In some implementations, inference module 118 and training module 246 may be combined.

In some implementations, training module 246 may also perform semi-supervised training of the machine learning model using unlabeled ground truth imagery 245 to increase the machine learning model's accuracy further. In such a context, the machine learning model may be referred to as the "base" model, which is further trained using semi-supervised training. For example, an unlabeled ground truth image 245 from the same domain—i.e. an image that depicts the same plant trait that the machine learning model is being trained to detect—may be processed by training module 246 using the machine learning model to generate a first prediction. As discussed previously, this first prediction may include a bounding box or pixel-wise annotations identifying the targeted plant trait in the image 245.

Then, the same unannotated ground truth image 245 may be altered, e.g., by flipping it horizontally or vertically, and processed by training module 246 to generate a second prediction (again, a bounding box or pixel-wise annotations). Training module 246 may then compare the first and second predictions to make sure that they are consistent with each other (e.g., are mirror images of each other) or otherwise satisfy some criterion. Any error between the first and second predictions may be used by training module 246, e.g., in addition to the errors between predictions made from quasi-realistic 2D images and their corresponding labels, to train the machine learning model further.

Additionally or alternatively, in some implementations, unannotated images 245 that, when processed by training module 246, generate predictions with sufficiently high confidences can be "pseudo-labeled" based on those predictions. These pseudo-labeled images can be merged with quasi-realistic 2d images 244 and used to re-train the machine learning model. In sum, by using both supervised and semi-supervised training, the resulting machine learning model (stored in database 120) is able to detect the targeted plant trait with greater accuracy than if either technique is performed alone.

FIGS. 3A and 3B demonstrate one example of how sim2real generator 242 may be trained. In this implementation, sim2real generator 242 takes the form of a generator machine learning model that is trained using a cyclic generative adversarial network ("GAN"), or "CycleGAN." Sim2real generator 242 may take various forms, such as a CNN, various other flavors of neural networks, etc. In FIG.

3A, ground truth images 352, which may or may not include all or some of ground truth digital images 230, may be retrieved from a corpus 350. Data indicative of ground truth images 352 may be processed by a real2sim generator 354—which like sim2real generator 242 may be a generator model of a GAN—to generate synthetic image(s) 356.

Synthetic image(s) 356 may be processed by a first discriminator ("DISCRIM. A") 358, which may generate output indicative of whether synthetic image(s) 358 are real or simulated. This output may be binary (e.g., real or synthetic) or may be a probability (e.g., 40% real, 60% synthetic). In various implementations, first discriminator 358 may take the form of a neural network such as a CNN, although this is not meant to be limiting. The output generated by/based on first discriminator 358 may be compared to labels assigned to synthetic image(s) 356 indicating that they are synthetic. To the extent any synthetic image(s) 356 are predicted by first discriminator 358 to be real, that may constitute a GAN loss $360_1$. GAN loss $360_1$ may be used to train first discriminator 358, e.g., using techniques such as gradient descent, back propagation, etc.

Meanwhile, synthetic image(s) 356 may be processed by sim2real generator 242 to generate first "cycled" image(s) $362_1$. As indicated by the name, first cycled image(s) $362_1$ have been cycled from the real (or "quasi-real") domain to the synthetic domain (by 354), and back to the real domain (by 242). First cycled image(s) $362_1$ may be compared to corresponding ground truth image(s) 352 to determine a first cycle loss $364_1$. First cycle loss $364_1$ may in turn be used to train real2sim generator 354 and/or sim2real generator 242, e.g., using techniques such as back propagation and gradient descent.

Also, in some implementations, ground truth image(s) 352 may be processed by/based on a second discriminator ("DISCRIM. B") 366. Second discriminator 366 may generate output indicative of whether those image(s) are real or synthetic. To the extent the output identified a ground truth image 352 as synthetic, that error or loss (not depicted) may be used to train a second discriminator 366, e.g., using gradient descent, back propagation, etc.

As part of CycleGAN, the same components depicted in FIG. 3A may be trained as shown in FIG. 3B, which is more or less a mirror image of the process of FIG. 3A. In other words, in FIG. 3A, ground truth images were translated from the real domain to the synthetic domain, and then back to the real domain, to see how well various features are preserved (similar to training an auto-encoder). In FIG. 3B, synthetic images are translated to the real domain, and then back to the synthetic domain, to see how well various features are preserved.

Starting at bottom right of FIG. 3B, synthetic image(s) 356 may be retrieved from a synthetic corpus 368 and processed by/based on sim2real generator 242 to generate quasi-realistic image(s) 370 (which may share characteristics with quasi-realistic 2D images 244 of FIG. 2). Quasi-realistic image(s) 370 may then be processed by/based on second discriminator 366 to generate output indicative of whether quasi-realistic image(s) 370 are real or synthetic. While they may resemble ground truth imagery, quasi-realistic image(s) 370 may nonetheless be labeled as synthetic because their origin lies in synthetic image(s) 356. A second GAN loss $360_2$ may represent a difference or error between these synthetic labels and output of second discriminator 366, and may be used to train second discriminator 366, similar to FIG. 3A wherein first discriminator 358 was trained.

Meanwhile, quasi-realistic image(s) 370 may be processed by real2sim generator 354 to generate second "cycled" image(s) $362_2$. As indicated by the name, second cycled image(s) $362_2$ have been cycled from the synthetic domain to the real domain (by 242), and back to the synthetic domain (by 354). Second cycled image(s) $362_2$ may be compared to corresponding synthetic image(s) 356 to determine a second cycle loss $364_2$. Second cycle loss $364_2$ may in turn be used to train siml2real generator 242 and/or real2sim generator 354, e.g., using techniques such as back propagation and gradient descent.

Also, in some implementations and similar to FIG. 3A, in FIG. 3B, synthetic image(s) 356 may be processed by/based on first discriminator 358. First discriminator 358 may generate output indicative of whether those image(s) are real or synthetic. To the extent the output identified a synthetic image 356 as real, that error or loss (not depicted) may be used to train first discriminator 358, e.g., using gradient descent, back propagation, etc. In some implementations, the training performed in FIG. 3B may be performed in tandem with, e.g., parallel with, the training performed in FIG. 3A, although this is not required.

One result of training in accordance with a CycleGAN as depicted in FIGS. 3A and 3B, particularly in conjunction with the process flow of FIG. 2, is that visual characteristics that make plants look realistic (e.g., the "finishing touches"), such as lighting, color, shadow, texture, noise, etc., can be learned by the sim2real generator 242. Meanwhile, underlying structure components of synthetic plants, such as number and arrangement of leaves, content of plants, shapes, logic (e.g., how leaves sprout from particular types of plants) may be learned, e.g., via asset extraction module 232 in FIG. 2.

Figure 4:
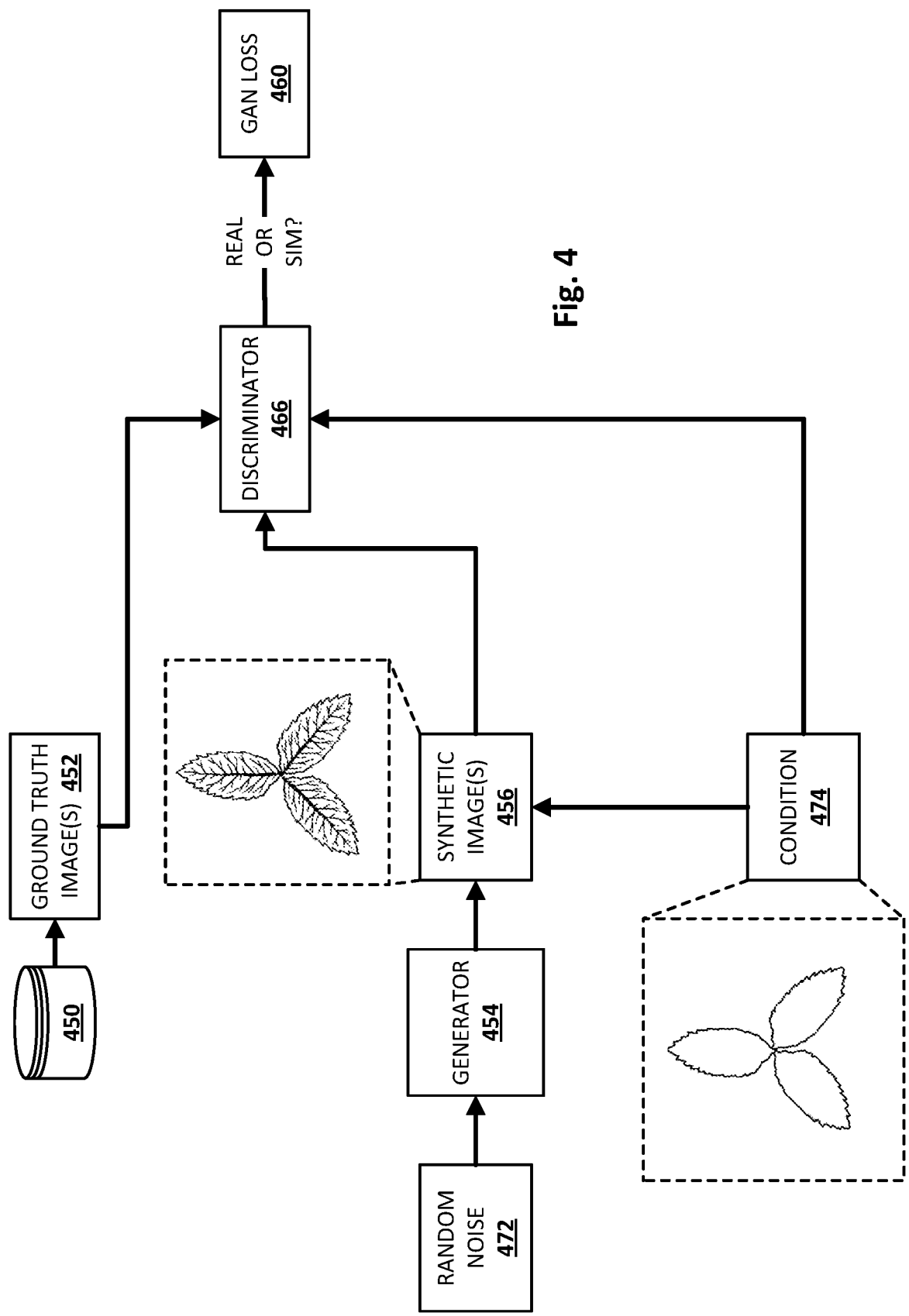
FIG. 4 depicts an example of how a conditional generative adversarial network may be employed, in accordance with various implementations.

FIG. 4 depicts one example of how a conditional GAN may be employed to generate synthetic training data in some implementations. Many components of FIG. 4 are similar to components of FIG. 3A and/or of FIG. 3B, and so are numbered similarly. However, the techniques demonstrated by FIG. 4 may or may not be practiced in conjunction with the training techniques described previously. Ground truth image(s) 452 may be retrieved from a corpus 450 and processed by/based on a discriminator model 466 to generate output indicative of whether those images are real or synthetic. The output may be compared to labels to train discriminator 466.

Meanwhile, synthetic image(s) 456 are also processed by/based on discriminator model 466 to generate output indicative of whether those images are real or synthetic, and the output may be compared to labels as described above. However, synthetic image(s) 456 are generated by a generator 454 based on random noise 472 and based on a condition 474. Condition 474 may act as a constraint that controls the generation of data based on random noise 472, somewhat like a bootstrap.

In some implementations, condition 474 may be a shape defined by, for instance, a user that is meant to resemble all or part of a plant. In FIG. 4, for instance, a user has drawn outlines of three leaves to act as a constraint for generation of synthetic image(s) 456. As shown in FIG. 4, synthetic image 456 includes the same three-leaf arrangement, except that texture, color, and other features extracted from, for instance, ground truth images of plants are filled in to make the three leaves appear quasi-realistic. Had the user drawn a hole in one of the leaves as part of condition 474, that hole may have appeared in synthetic image 456. In some implementations, the textures, colors, shadows, noise, lighting, etc. that are filled into synthetic image 456 may be learned by generator 454 as part of a GAN or CycleGAN-based training process.

Figure 5:
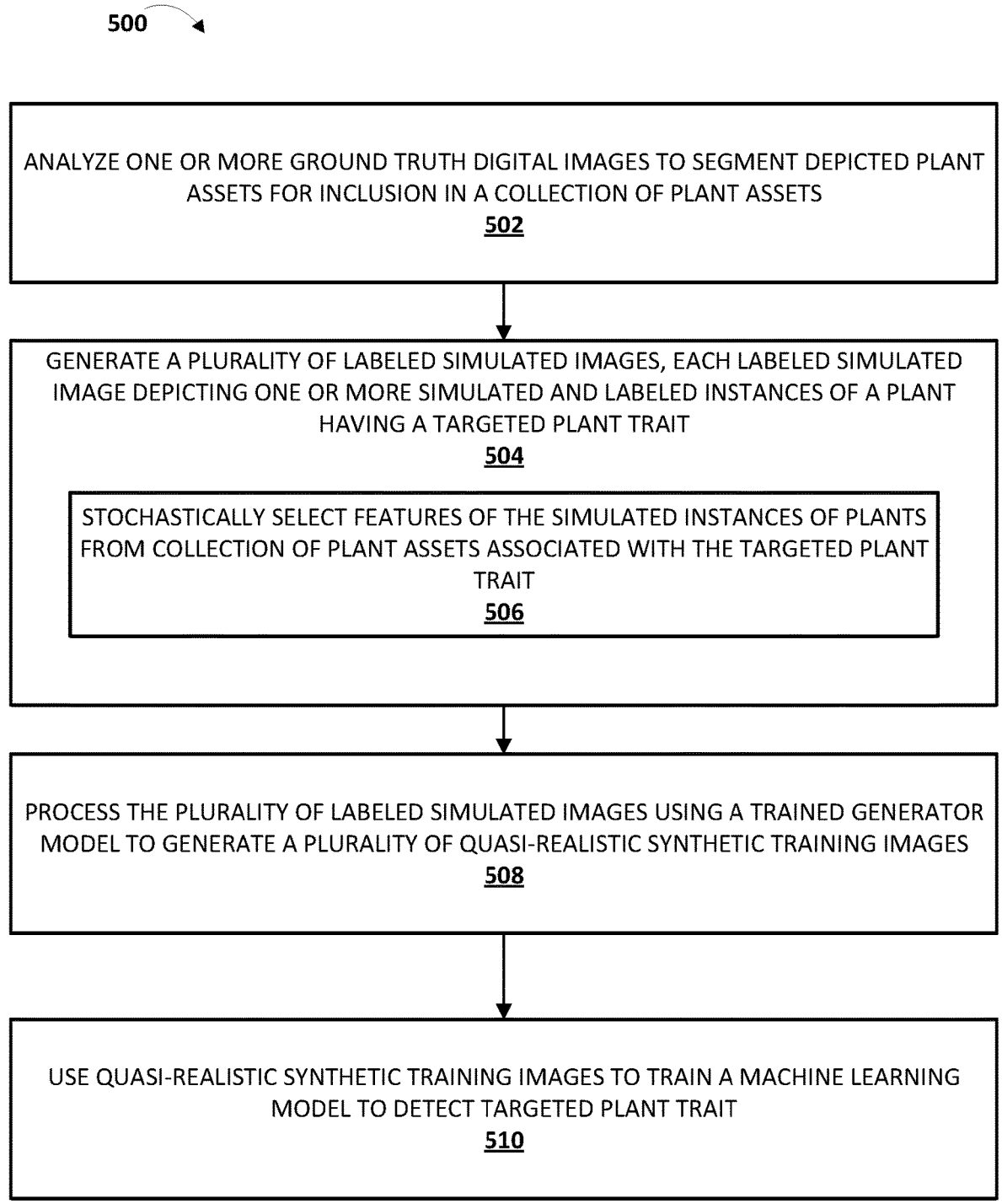
FIG. 5 is a flowchart of an example method in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system, e.g., by way of asset extraction module 232, may analyze one or more ground truth digital images to segment depicted plant assets for inclusion in a collection of plant assets. In various implementations, the one or more ground truth digital images may depict real-life instances of plants having a target plant trait. Segmentation may be performed in various ways, such as by using thresholding, clustering methods (e.g., k-means clustering), motion and/or interactive segmentation, compression-based methods, histogram-based methods, edge detection, dual clustering, region growing methods, parametric methods, level-set methods, fast marching methods, pixel-wise segmentation using machine learning models such as a CNN, Markov random fields, etc.

At block 504, the system, e.g., by way of 3D simulation module 236 and/or 2D rendering module 238, may generate a plurality of labeled simulated images (e.g., 240). Each labeled simulated image may depict one or more simulated and labeled instances of a plant having a targeted plant trait. In some implementations, the generating of block 504 includes, at block 506, stochastically selecting, e.g., by 3D simulation module 236, features of the simulated instances of plants from the collection of plant assets mentioned as part of block 502. In various implementations, the stochastically selecting at block 506 may be based on different weights assigned to different plant assets of the collection. In some such implementations, the different weights may be selected based on one or more environmental conditions observed or predicted in a selected geographic area.

At block 508, the system may process the plurality of labeled simulated images using a trained generator model, such as sim2real generator 242, to generate a plurality of quasi-realistic synthetic training images (e.g., 244, 370). Each quasi-realistic synthetic training image may depict one or more quasi-realistic and labeled instances of the targeted plant trait. Consequently, these quasi-realistic images may be suitable for, at block 510, training a perception machine learning model, such as a CNN, to detect the targeted plant trait in digital images.

Figure 6:
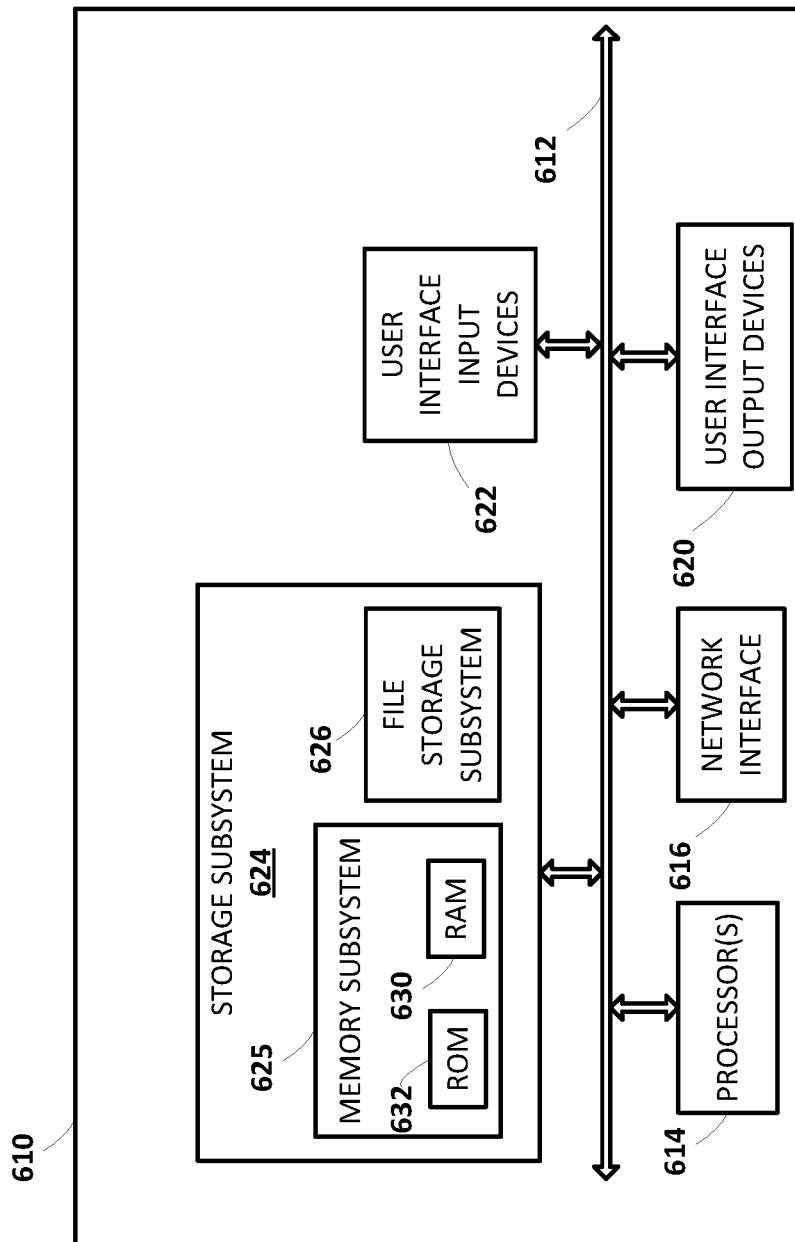
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1-4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:
   generating a plurality of labeled simulated images, each labeled simulated image depicting one or more simulated and labeled instances of a plant having a targeted plant trait,
      wherein the generating includes stochastically selecting features of the simulated instances of plants from a collection of plant assets associated with the targeted plant trait, wherein the collection of plant assets are obtained from one or more ground truth digital images captured previously by one or more vision sensors, and
      wherein the one or more ground truth digital images depict real-life instances of plants having the target plant trait; and
   subsequent to generating the plurality of labeled simulated images, translating the plurality of labeled simulated images from a simulated domain to a quasi-realistic domain using a trained conditional generator model of a generative adversarial network, wherein the translating includes preserving the labels from the plurality of labeled simulated images and generating a plurality of quasi-realistic synthetic training images based at least in part on random noise and subject to one or more user-provided constraints, including a shape defined by user input, wherein each quasi-realistic synthetic training image depicts one or more quasi-realistic and labeled instances of the targeted plant trait.

2. The method of claim 1, wherein the generator model is trained at least in part based on one or more of the ground truth digital images.

3. The method of claim 1, further comprising analyzing the one or more ground truth digital images to segment depicted plant assets for inclusion in the collection of plant assets.

4. The method of claim 3, wherein the depicted plant assets include one or more features of leaves of plant(s) having the targeted plant trait.

5. The method of claim 1, wherein the plurality of labeled simulated images are labeled with pixel-wise annotations or bounding shapes.

6. The method of claim 1, wherein the stochastically selecting is based on different weights assigned to different plant assets of the collection.

7. The method of claim 6, wherein the different weights are selected based on one or more environmental conditions observed or predicted in a selected geographic area.

8. The method of claim 1, wherein the generative adversarial network comprises a cycle generative adversarial network (cycleGAN).

9. A system comprising one or more processors and memory storing instructions that, in response to execution of the instructions by the one or more processors, cause the one or more processors to:
   generate a plurality of labeled simulated images, each labeled simulated image depicting one or more simulated and labeled instances of a plant having a targeted plant trait,
      wherein the generation includes stochastically selection of features of the simulated instances of plants from a collection of plant assets associated with the targeted plant trait, wherein the collection of plant assets are obtained from one or more ground truth digital images captured previously by one or more vision sensors, and
      wherein the one or more ground truth digital images depict real-life instances of plants having the target plant trait; and
   once the plurality of labeled simulated images are generated, translate the plurality of labeled simulated images from a simulated domain to a quasi-realistic domain using a trained conditional generator model of a generative adversarial network, wherein the translation includes preservation of the labels from the plurality of labeled simulated images and generation of a plurality of quasi-realistic synthetic training images based at least in part on random noise and subject to one or more user-provided constraints, including a shape defined by user input, wherein each quasi-realistic synthetic training image depicts one or more quasi-realistic and labeled instances of the targeted plant trait.

10. The system of claim 9, wherein the generator model is trained at least in part based on one or more of the ground truth digital images.

11. The system of claim 9, further comprising instructions to analyze the one or more ground truth digital images to segment depicted plant assets for inclusion in the collection of plant assets.

12. The system of claim 11, wherein the depicted plant assets include one or more features of leaves of plant(s) having the targeted plant trait.

13. The system of claim 9, wherein the plurality of labeled simulated images are labeled with pixel-wise annotations or bounding shapes.

14. The system of claim 9, wherein the stochastically selecting is based on different weights assigned to different plant assets of the collection.

15. The system of claim 14, wherein the different weights are selected based on one or more environmental conditions observed or predicted in a selected geographic area.

16. The system of claim 9, wherein the generative adversarial network comprises a cycle generative adversarial network (cycleGAN).

17. At least one non-transitory computer-readable medium comprising instructions that, in response to execution of the instructions by one or more processors, cause the one or more processors to perform the following operations:

generating a plurality of labeled simulated images, each labeled simulated image depicting one or more simulated and labeled instances of a plant having a targeted plant trait,
- wherein the generating includes stochastically selecting features of the simulated instances of plants from a collection of plant assets associated with the targeted plant trait, wherein the collection of plant assets are obtained from one or more ground truth digital images captured previously by one or more vision sensors, and
- wherein the one or more ground truth digital images depict real-life instances of plants having the target plant trait; and subsequent to the generating, translating the plurality of labeled simulated images from a simulated domain to a quasi-realistic domain using a trained conditional generator model of a generative adversarial network, wherein the translating includes preserving the labels from the plurality of labeled simulated images and generating a plurality of quasi-realistic synthetic training images based at least in part on random noise and subject to one or more user-provided constraints, including a shape defined by user input, wherein each quasi-realistic synthetic training image depicts one or more quasi-realistic and labeled instances of the targeted plant trait.

18. The at least one non-transitory computer-readable medium of claim 17, wherein the generator model is trained at least in part based on one or more of the ground truth digital images.

* * * * *